US007640257B2

United States Patent
Watzke

(10) Patent No.: US 7,640,257 B2
(45) Date of Patent: Dec. 29, 2009

(54) SPATIAL JOIN IN A PARALLEL DATABASE MANAGEMENT SYSTEM

(75) Inventor: Michael Watzke, Madison, WI (US)

(73) Assignee: Teradata US, Inc., Miamisburg, OH (US)

( * ) Notice: Subject to any disclaimer, the term of this patent is extended or adjusted under 35 U.S.C. 154(b) by 315 days.

(21) Appl. No.: 11/836,186

(22) Filed: Aug. 9, 2007

(65) Prior Publication Data

US 2009/0043726 A1 Feb. 12, 2009

(51) Int. Cl.
*G06F 7/00* (2006.01)
*G06F 17/30* (2006.01)
(52) U.S. Cl. .......................................... 707/100; 707/2
(58) Field of Classification Search ................ 707/100, 707/102; 709/200; 703/2
See application file for complete search history.

(56) References Cited

U.S. PATENT DOCUMENTS

| | | | |
|---|---|---|---|
| 6,282,533 B1 | 8/2001 | Ramaswamy et al. | |
| 6,285,996 B1* | 9/2001 | Jou et al. | 707/4 |
| 6,728,694 B1* | 4/2004 | Ramasamy et al. | 707/2 |
| 6,920,446 B1* | 7/2005 | Wang et al. | 707/2 |
| 7,010,564 B2* | 3/2006 | Morimoto et al. | 709/200 |
| 7,054,852 B1 | 5/2006 | Cohen | |
| 7,386,561 B1* | 6/2008 | Ramesh et al. | 707/102 |
| 2002/0059273 A1* | 5/2002 | Morimoto et al. | 707/100 |
| 2004/0193392 A1* | 9/2004 | Williams et al. | 703/2 |

* cited by examiner

*Primary Examiner*—Hung T Vy
(74) *Attorney, Agent, or Firm*—Schwegman Lundberg & Woessner

(57) ABSTRACT

There is provided a method, a system and a machine readable medium to execute a spatial query against a plurality of input tables of a distributed database. The method comprises: mapping spatial objects of a first input table to a first spatial grid, the first spatial grid including a plurality of first spatial cells; redistributing the spatial objects of the first input table to a first intermediate table of one or more access module processors based on the first spatial cell of the first spatial grid to which each of the spatial objects is mapped; determining whether one or more first spatial cells of the first spatial grid are skewed; subdividing each of the skewed one or more first spatial cells to a second spatial grid, the second spatial grid including a plurality of second spatial cells; mapping spatial objects of the first intermediate file to the second spatial grid, the second spatial grid including a plurality of second spatial cells; redistributing the spatial objects of the first intermediate file to one or more access module processors based on the second spatial cell of the second spatial grid to which each of the spatial objects is mapped; mapping spatial objects of a second input table to the first spatial grid and the second spatial grid; redistributing the spatial objects of the second input table to a second intermediate file of one or more access module processors based on the first spatial cell of the first spatial grid and the second spatial cell of the second spatial grid to which each of the spatial objects is mapped; and joining the spatial objects of the first intermediate file to spatial objects of the second intermediate file for each first spatial cell of the first spatial grid or the second spatial cell of the second spatial grid.

30 Claims, 10 Drawing Sheets

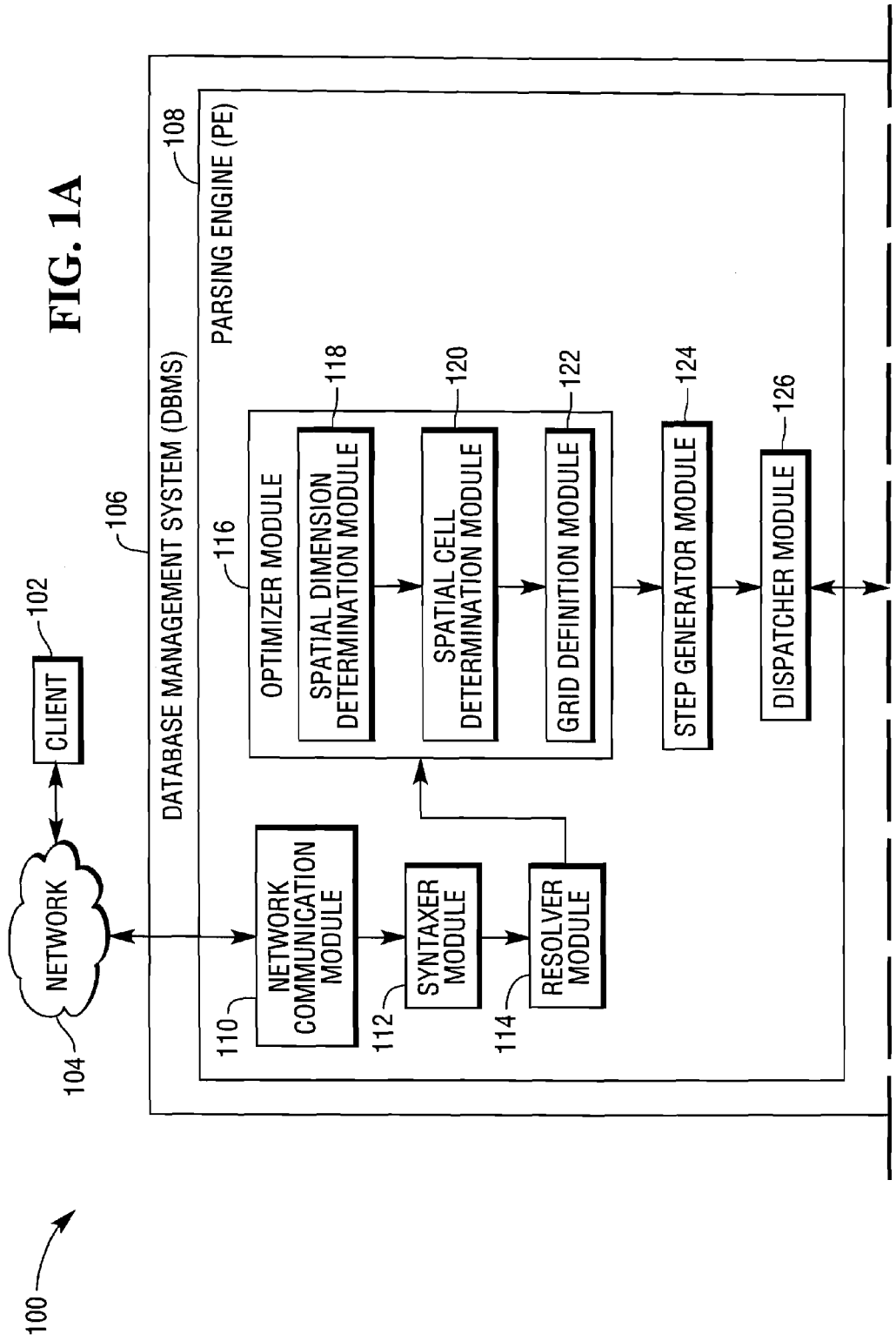

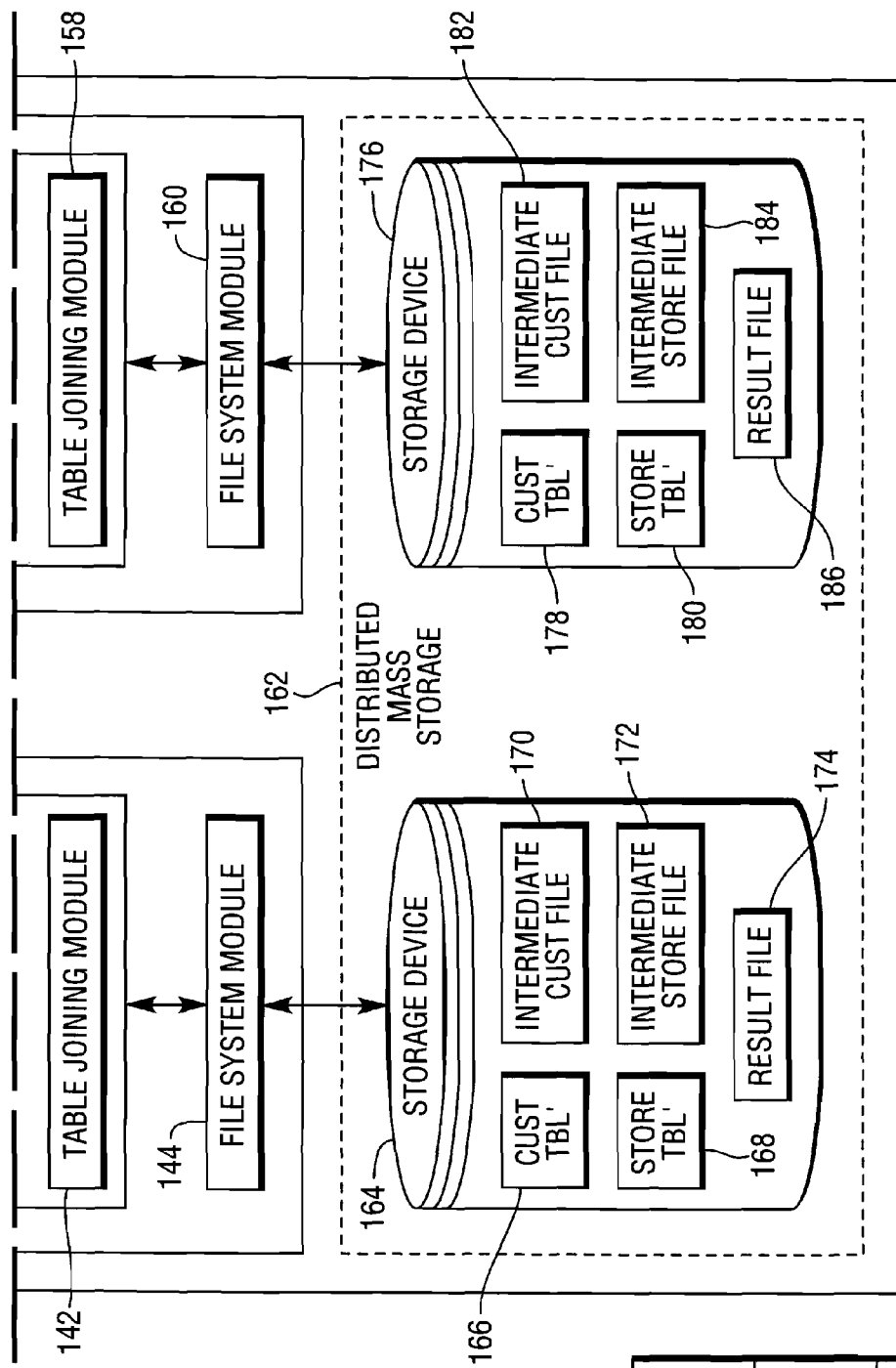

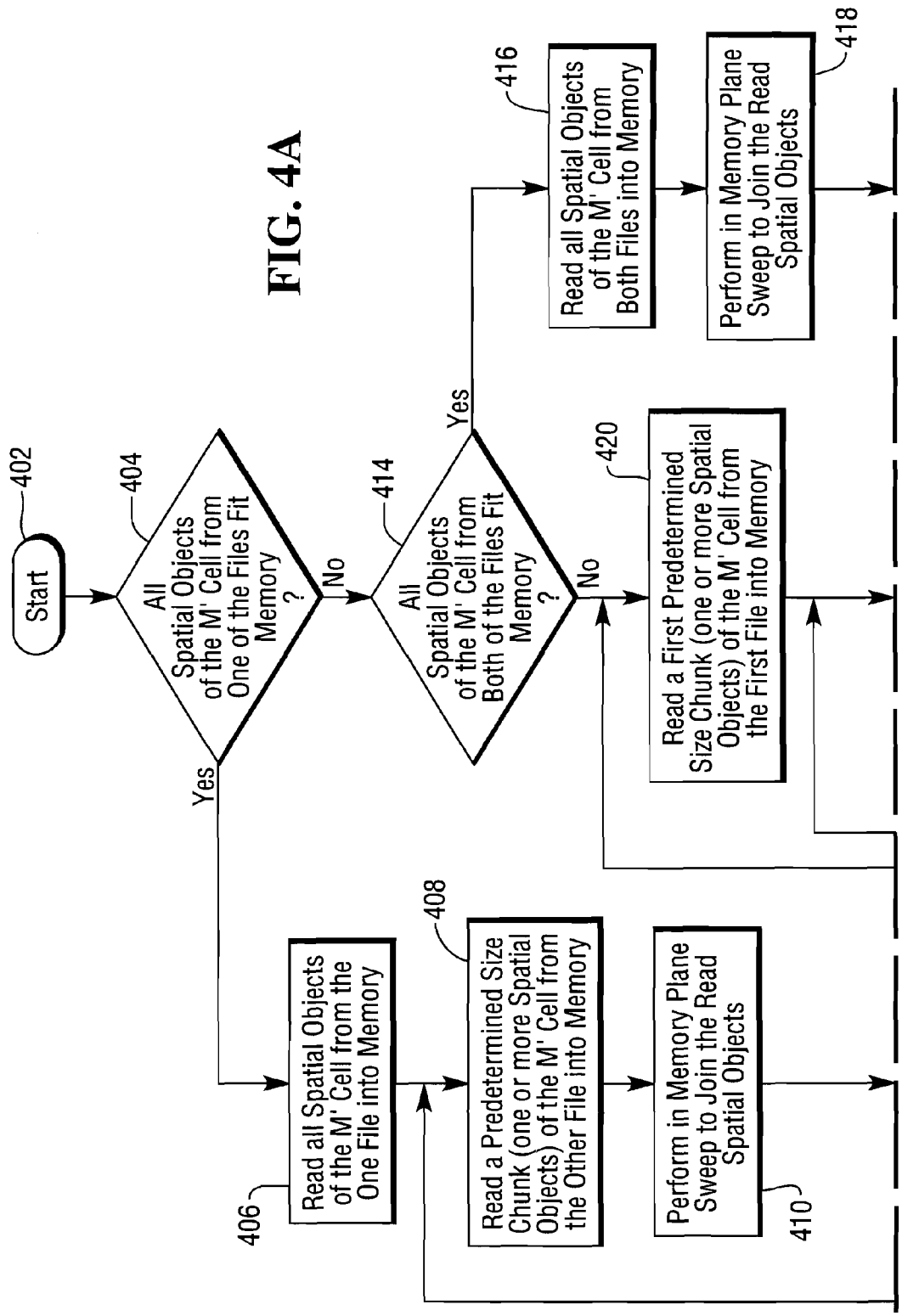

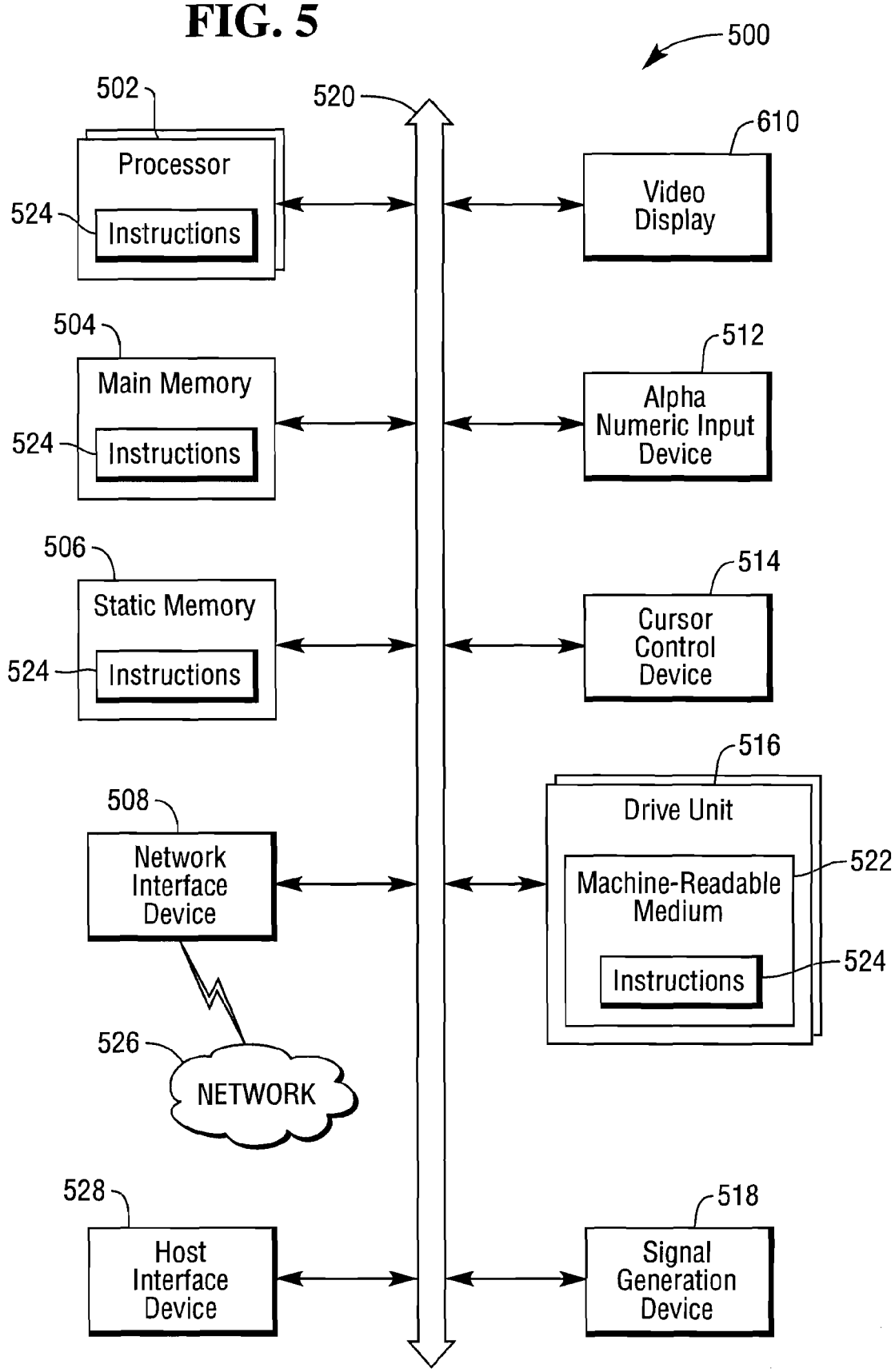

SPATIAL JOIN IN A PARALLEL DATABASE MANAGEMENT SYSTEM

TECHNICAL FIELD

This disclosure relates to database management systems. More particularly, this disclosure is directed to spatial join in a parallel database management system (DBMS).

BACKGROUND

Invariably, algorithms for joining spatial objects in a partitioned parallel environment are more complex than traditional algorithms for joining non-spatial objects. In order to support partitioned parallelism for spatial objects, a mechanism to partition input spatial data to the units of parallelism must be defined. There are three fundamental abstractions for spatial objects: point, line and polygon. Lines and polygons prevent the direct application of traditional partitioning algorithms to input spatial data because they represent extents in space. This characteristic of spatial data results in either a multidimensional representation or a linear transformation representation.

A typical partitioning mechanism for spatial data is based on space decomposition. Generally, space is decomposed into regions, the regions are assigned to the partitions (units of parallelism) and the spatial objects can be partitioned based on their relationship with the regions. For example, a region in a dynamic data structure such as an R-tree is a minimum bounding rectangle (MBR). In the R-tree, a spatial object is assigned or mapped to a single region, which satisfies some placement criteria, such as minimizing area expansion, region overlap, and the like. On the other hand, a partitioning mechanism using a static data structure such as an N×N grid provides a disjoint decomposition of space that may lead to spatial object duplication during the partitioning phase.

A spatial object's geometry is usually represented by a list of vertices, which represents a spatial object's position and shape in some N dimensional space. Typically, a spatial join of spatial objects is processed using a filter and refinement strategy. In the filter phase, an approximation of the spatial objects (MBR) is used to perform fast data preprocessing. In the refinement phase, the spatial objects' actual geometry is used to perform the final join process. There can be separate join algorithms for the filter phase and the refinement phase. An efficient filter join algorithm in the in memory plane sweep.

In view of the foregoing, conventional space decomposition does not provide a mechanism which may partition spatial objects to regions to avoid overlap and redundancy, facilitating even spatial distribution of input spatial data. Improvement in the spatial partitioning of input spatial data may improve significantly the spatial join of the partitioned spatial data.

SUMMARY

In accordance with an embodiment, there is provided a method to execute a spatial query against a plurality of input tables of a distributed database. The method comprises: mapping spatial objects of a first input table to a first spatial grid, the first spatial grid including a plurality of first spatial cells; redistributing the spatial objects of the first input table to a first intermediate table of one or more access module processors based on the first spatial cell of the first spatial grid to which each of the spatial objects is mapped; determining whether one or more first spatial cells of the first spatial grid are skewed; subdividing each of the skewed one or more first spatial cells to a second spatial grid, the second spatial grid including a plurality of second spatial cells; mapping spatial objects of the first intermediate file to the second spatial grid, the second spatial grid including a plurality of second spatial cells; redistributing the spatial objects of the first intermediate file to one or more access module processors based on the second spatial cell of the second spatial grid to which each of the spatial objects is mapped; mapping spatial objects of a second input table to the first spatial grid and the second spatial grid; redistributing the spatial objects of the second input table to a second intermediate file of one or more access module processors based on the first spatial cell of the first spatial grid and the second spatial cell of the second spatial grid to which each of the spatial objects is mapped; and joining the spatial objects of the first intermediate file to spatial objects of the second intermediate file for each first spatial cell of the first spatial grid or second spatial cell of the second spatial grid.

In accordance with another embodiment, there is provided a system to execute a spatial query against a plurality of input tables of a distributed database. The system comprises: a spatial object mapping module to map spatial objects of a first input table to a first spatial grid that includes a plurality of first spatial cells, to map spatial objects of a first intermediate file to a second spatial grid that includes a plurality of second spatial cells, and to map spatial objects of a second input table to the first spatial grid and the second spatial grid; a skew determination module to determine whether one or more first spatial cells of the first spatial grid are skewed; a spatial cell subdivision module to subdivide each of the skewed one or more first spatial cells to the second spatial grid that includes a plurality of second spatial cells; a redistribution module to redistribute the spatial objects of the first intermediate file to one or more access module processors based on the second spatial cell of the second spatial grid to which each of the spatial objects is mapped, and to redistribute the spatial objects of the second input table to a second intermediate file of one or more access module processors based on the first spatial cell of the first spatial grid and the second spatial cell of the second spatial grid to which each of the spatial objects is mapped; and a table joining module to join spatial objects of the first intermediate file to spatial objects of the second intermediate file for each first spatial cell of the first spatial grid or second spatial cell of the second spatial grid.

In accordance with a further embodiment, there is provided a machine-readable medium including instructions executable by the machine to execute a spatial query against a plurality of input tables of a distributed database. The instructions causing the machine to: map spatial objects of a first input table to a first spatial grid, the first spatial grid including a plurality of first spatial cells; redistribute the spatial objects of the first input table to a first intermediate table of one or more access module processors based on the first spatial cell of the first spatial grid to which each of the spatial objects is mapped; determine whether one or more first spatial cells of the first spatial grid are skewed; subdivide each of the skewed one or more first spatial cells to a second spatial grid, the second spatial grid including a plurality of second spatial cells; map spatial objects of the first intermediate file to the second spatial grid, the second spatial grid including a plurality of second spatial cells; redistribute the spatial objects of the first intermediate file to one or more access module processors based on the second spatial cell of the second spatial grid to which each of the spatial objects is mapped; map spatial objects of a second input table to the first spatial grid and the second spatial grid; redistribute the spatial objects of the second input table to a second intermediate file of one or more access module processors based on the first spatial cell of the first spatial grid and the second spatial cell of the second spatial grid to which each of the spatial objects is mapped; and join the spatial objects of the first intermediate file to spatial objects of the second intermediate file for each first spatial cell of the first spatial grid or second spatial cell of the second spatial grid.

BRIEF DESCRIPTION OF THE DRAWINGS

Various features and attendant advantages of the example embodiments will be more fully appreciated as the same becomes better understood when considered in conjunction with the accompanying drawings, in which like reference characters designate the same or similar parts throughout the several views, and wherein:

FIG. 5 is a diagrammatic representation of machine in an example form of a computer system within which a set of instructions, for causing the machine to perform any one or more of the methodologies discussed herein in FIGS. 1-4, may be executed.

DETAILED DESCRIPTION

Figure 1B:
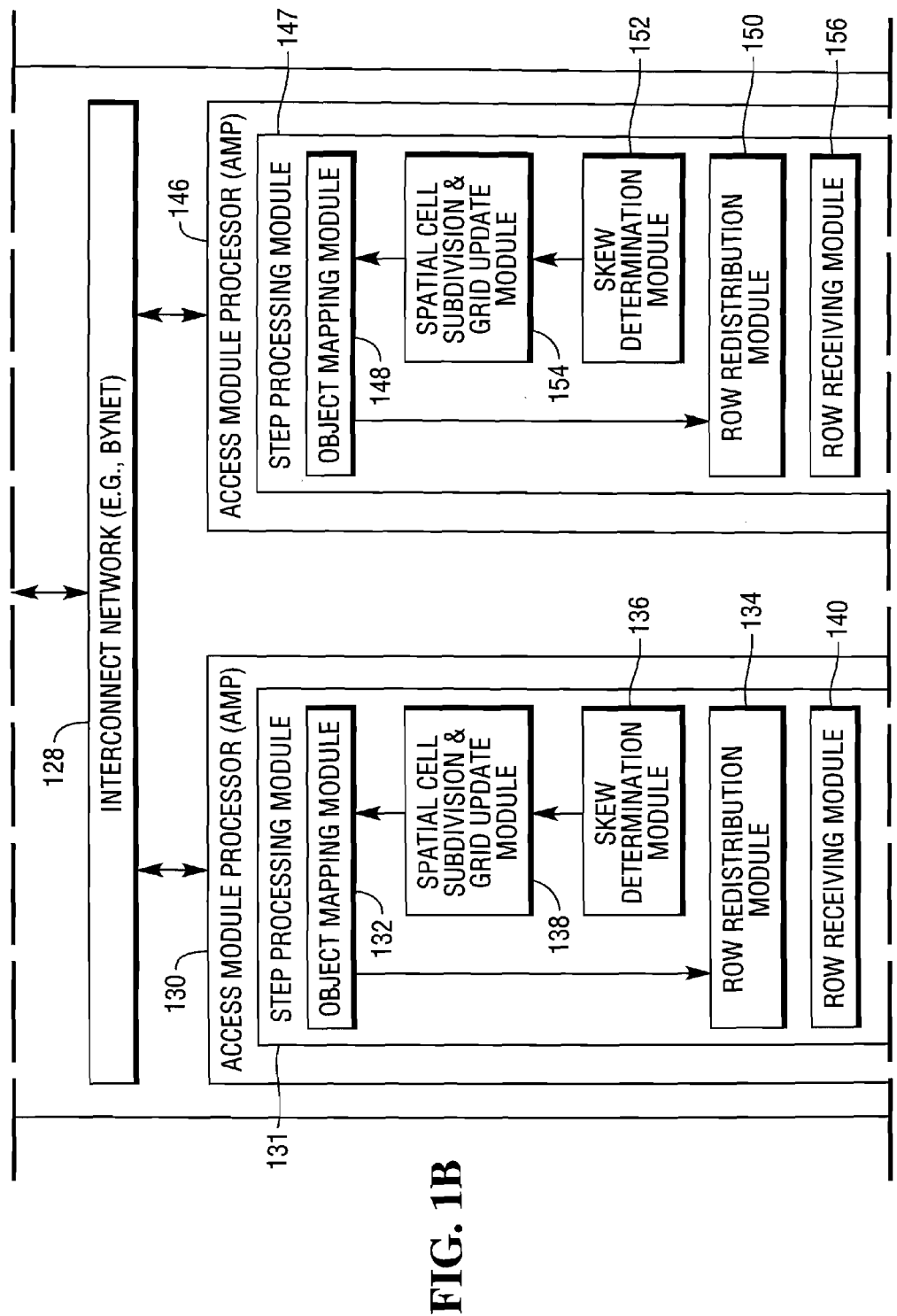
FIG. 1 is an example query system including an example parallel processing database management system (DBMS) that provides improved partitioning of input spatial data for a spatial join associated with the execution of a query or a request from a requesting system.

FIG. 1 is an example query system 100 including an example parallel processing database management system (DBMS) 108 that provides improved partitioning of input spatial data for a spatial join associated with the execution of a query or a request from a requesting system 102. The requesting system may include a network client 102, as well as other device such as a mainframe (not shown). The query or request may be a structured query language (SQL) spatial query including a spatial join, executed against a database (e.g., including plural tables 166, 168, 178, 180) distributed amongst respective plural storage devices 164 and 176 in distributed mass storage 162. The DMBS 106 includes a parsing engine (PE) 108, an interconnect network 128, one or more access module processors (AMPs) 130, 146, and the distributed mass storage 162.

Further with reference to FIG. 1, the parsing engine 108 and associated AMPs 130, 146 may be virtual processors executed by the DBMS 106. The parsing engine 108 communicates with the requesting system 102 to receive a spatial query (or multiple spatial queries) against the distributed database stored in distributed mass storage 162. As the requesting system may be a network client 102, the PE 108 includes a network communication module 110 to receive one or more spatial queries from the network client 102 via the communication network 104. As the requesting system may also be a mainframe, the PE 108 may also include a host channel adapter (not shown) to receive one or more spatial queries from the mainframe. The communication network 104 may be any conventional network, including the Internet, Wide Area Network (WAN), Metropolitan Area Network (MAN), Campus Area Network (CAN), Local Area Network (LAN), Home Area Network (HAN), wireless (802.11), satellite network, as well as different combinations thereof.

Still further with reference to FIG. 1, the syntaxer module 112 verifies the syntax of the received spatial query (e.g., SQL request). If the syntaxer module 112 determines that there are no errors in the incoming spatial query, the syntaxer module 112 converts the received spatial query into a parse tree (not shown) and transmits the parse tree as an input parameter to the resolver module 114. The parse tree includes nodes that represent the received spatial query as entered by the user. If the syntaxer module 112 determines that there is a grammatical error in the received spatial query (e.g., improper syntax), the syntaxer module 112 returns a syntax error message to the requesting system 102 via the network communication module 110. The resolver module 114 resolves or converts database, table, view, or macro names of symbolic operations in the received parse tree to numeric identifiers, determines data types and sizes of all parameters (e.g., integer; 4 bytes) and columns involved in the symbolic operations, and then transmits the resolved parse tree (not shown) as an input parameter to the optimizer module 116.

Now with particular reference to the optimizer module 116 of FIG. 1, the optimizer module 116 determines an optimized plan, e.g., a least expensive plan in terms of resources (e.g., usage of AMPs 130, 146, access to storage devices 164, 176, intermediate files 170, 172, 182, 184, and the like), to answer the received spatial query and optimizes the resolved parse tree into an optimized plan tree (not shown) that reflects the determined plan. More specifically, the optimized plan tree includes a set of individual statement trees, where each individual statement tree corresponds to a particular AMP processing step to be executed by one or more of AMPs 130, 146. That is, the individual statement tree may include a flag node that indicates whether the corresponding AMP processing step is to be distributed to all AMPs 130, 146, a single AMP, or a subset of the AMPs 130, 146 in the DBMS system 106. Furthermore, each statement tree includes plural sub-trees, which represent one or more source tables involved in an AMP processing step and a sub-tree representing an intermediate or a final result file that is to be produced by the AMP processing step. Thus, a sub-tree that represents a source table is referred to as source sub-tree and a sub-tree that represents an intermediate file or a final result file is referred to as sink sub-tree.

Further with reference to the optimizer module 116 of FIG. 1, the optimizer module 116 includes a spatial dimension determination module 118, a spatial cell determination module 120 and a grid definition module 122. The spatial dimension determination module 118 determines the spatial dimensions (e.g., the spatial universe) in terms of latitude and longitude of the spatial data in the tables of the database (e.g., tables 166, 178, 168, 180) distributed amongst storage devices 164, 176 of the distributed mass storage 162. The spatial dimensions may be obtained from a data dictionary (not shown) for each particular table. The spatial cell determination module 120 determines a number of spatial cells (N) for the spatial universe determined by the spatial dimension determination module 118. This determination may be based on a number of spatial objects (e.g., rows) in the tables of the database, the types of spatial objects (e.g., point, line, polygon) and an average area of the spatial objects. This statistical data may be maintained in a certain data dictionary table which may be cached in memory by the PE 108. The spatial cell determination module inserts the spatial cell count (N) into the optimized plan tree. The grid definition module 122 defines a grid of cells (N×N) in latitude and longitude using the spatial universe and the spatial cell count (N), e.g., determining particular dimensions in latitude and longitude of the spatial cells (N) in the grid. For clarity and simplicity, a grid of (N×N or $N^2$) cells is defined. The grid definition module 122 inserts the spatial definitions of the first cells into the optimized plan tree.

Now with particular reference to the step generator module 124 of FIG. 1, the step generator module 124 generates one or more steps from the optimized plan tree, e.g., transforming each statement tree within the optimized plan tree into a corresponding concrete AMP processing step (not shown) that is to be executed by the AMPs 130, 146 to process the input spatial query from the requesting systems 102. Each concrete AMP processing step may be a transmittable message that encapsulates all of the pertinent information (e.g., context) extracted from an associated statement tree as parameters in the message. Thus, the concrete AMP processing step will include the context for each of the involved source tables (e.g., source context), as well as the context for each of the one or more intermediate files or the result file (e.g., sink context). The step generator module 124 transmits the one or more concrete AMP steps to the dispatcher module 126 for dispatch to the appropriate AMPs 130, 146 for execution.

Now with particular reference to the dispatcher module 126 of FIG. 1, the dispatcher 126 examines the context of each concrete AMP processing step (e.g. message) received from the step generator module 124 to determine whether the concrete AMP processing step is to be distributed to all AMPs 130, 146, a single AMP, or a subset of AMPs within the DBMS 106. As described previously, a flag node may have been included in a statement tree that indicates whether the corresponding concrete AMP processing step is to be distributed to all AMPs 130, 146, a single AMP or a subset of the AMPs 130, 146 in the DBMS system 106. Based on the determination, the dispatcher module 126 dispatches the received one or more concrete AMP processing steps to the appropriate AMPs 130, 146 via the interconnect network 128 and awaits for responses from the respective AMPs 130, 146. That is, the dispatcher module 126 dispatches or transmits the individual concrete AMP processing steps that represent the received spatial query to AMPs 130, 146 of the DBMS 106 for processing/execution. More specifically, the dispatcher module 126 may place the concrete AMP processing steps, one at a time, on the interconnect network 128 until all the concrete AMP processing steps associated with the received request are have been dispatched. The dispatcher module 126 further awaits completion responses for the concrete AMP processing steps from AMPs 130, 146, and unifies the returned results from the AMPs 130, 146 into a spatial query result. The dispatcher module 126 returns the spatial query result (e.g., rows of the distributed database from distributed mass storage 162; storage devices 164, 176) to the requesting system 104.

Now with particular reference to the AMPs 130, 146 of FIG. 1, AMP 130 includes a step processing module 131 and a file system module 144, and AMP 146 includes a step processing module 147 and a file system module 160. The file system 144 of AMP 130 manages access (read/write) to storage device 164, while file system module 160 of AMP 146 manages access to storage device 176. It should be noted that the DBMS 106 may include any number of parallel processing AMPs as may be desired. However, for clarity and conciseness of the description, only two AMPs 130, 146 are illustrated. Each AMP 130, 146 may be a virtual processor that receives concrete AMP processing steps via interconnect network 128 from parsing engine (PE) 108 and performs database functions to retrieve or update data in the database stored across disparate storage devices 164, 176 of the distributed mass storage 162.

Further with reference to the AMPs 130, 146 of FIG. 1, the step processing module 141, 147 of AMP 130, 146 includes an object a mapping module 132, 148 that maps local spatial objects (e.g., rows) stored in storage device 164, 176 (e.g., table 166, 168, 178, 180) to the N×N grid defined by the grid definition module 122 of the PE 108. The row redistribution module 134, 152 redistributes the mapped rows to AMPs 130,146 based on the grid cell to which they are mapped. More specifically, a subset of the of the N×N grid may be associated with a particular AMP 130, 146 and each cell of the N×N grid my be associated with a grid cell number. The cells may be numbered using a space filling curve. The mapped rows may be redistributed to appropriate AMPs 130, 146 based on a hash of the grid cell number. Other approaches such as round robin, range assignment, or the like, may be used instead of hashing the grid cell number. The step processing module 141, 147 of AMP 130, 146 further includes a skew determination module 136, 152 that determines whether a cell of the N×N grid is skewed, e.g., includes more spatial objects than an average number of spatial objects across the cells of the N×N grid. Multiple mechanisms may be used to determine whether a cell is skewed. For example, a determination may be made as to whether a number of spatial objects of a cell is a certain percentage larger than an average of assigned cells. More specifically, each AMP 130, 146 may track the number of objects per cell as it is assigned and an average may be used to define skew. The spatial cell subdivision and grid update module 138, 154 subdivides a skewed N cell determined by the skew determination module 136, 152 into a grid of M×M cells and returns the subdivided N cell and associated M×M grid to the dispatcher module 126 via interconnect network 128. The subdivision of the N cell into M cells is similar to the determination of spatial cells performed by the spatial cell determination module 120 of the PE 108. The subdivided M cells may also be numbed using a space filling curve. For any subdivided N cells of AMPs 130, 146, the object mapping module 132, 148 maps local spatial objects (e.g., rows of table 166, 168, 178, 180) associated with the subdivided N cell and stored in storage device 164, 176 to the M×M grid that is associated with the subdivided N cell.

Still further with reference to the AMPs 130, 146 of FIG. 1, the row redistribution module 134, 152 redistributes the mapped rows to AMPs 130,146 based on the M grid cell to which they are mapped. The mapped rows may be redistributed to appropriate AMPs 130, 146 based on a hash of the M grid cell number or another approach described above (e.g., round robin, range assignment or the like). The Tow receiving-module 140, 156 receives the redistributed rows (e.g., spatial objects) and processes them for storage via file system module 144, 160 to the appropriate intermediate files 170 and 172, 180 and 184. Each of the redistributed rows is appended with a field to specify a grid cell to which the redistributed row is assigned. The step processing module 141, 147 of AMP 130, 146 also includes a table joining module 144, 160 that performs a spatial join amongst the intermediate files 170 and 172, 180 and 184 and stores the result in result file 174, 186. The processing performed by the table joining module 142, 158 will be described hereinafter with regard to an example spatial join. The foregoing generally describes the modules of the AMPs 130, 146 to perform operations for a spatial join against the distributed database via one or more AMP processing steps. It is reiterated that when requested to perform a database operation by a concrete AMP processing step, an AMP 130, 146 performs that database operation against its own localized portion of the distributed database in a respective storage device 164, 176, as will be described in an example hereinafter. Thus, as mentioned earlier, each AMP 130, 146 manages its own storage device of the distributed mass storage 162; AMP 130 manages storage device 164 and AMP 136 manages storage device 176.

Now with particular reference to distributed mass storage 162 of FIG. 1, the distributed mass storage 162 includes plural storage devices 164, 176 (e.g., disk drives, optical drives and the like). The following illustrates one example of the contents of the distributed mass storage 162. Thus, for example, a database (not shown) may include two example tables (e.g., CUST TBL and STORE TBL), each having one thousand (1000) rows. DBMS 106 (e.g., Teradata by NCR Corp.) may employ a specialized distribution routine (e.g., hash routine) to determine an even distribution of rows of a table of the database across storage devices 164, 176. Each table in the database may have an associated primary index consisting of one or more columns of the table, the primary index being declared at the time the table was created. For example, the prime index of CUST TBL (e.g., 166 and 178) may be indexed by a column CUST_ID, while STORE TBL (e.g., 168 and 180) may be indexed by STORE_ID. The primary index value of each row in the table is passed into the hash routine, the result of which can be used to map the row to one of the AMPs 130, 146 configured in the DBMS 106. A key requirement for the hash routine is that if the value of column A is equal to the value of column B, then it must also be true that the hash (column A) is equal to the hash (column B). This ensures that rows that have equal primary index values will always be distributed to the same AMP 130, 146. Thus, use of the hash routine facilitates a distribution of the rows of the table in as even a manner as possible across the AMPs 130, 146.

Further with reference to the distributed mass storage 162 of FIG. 1, for the purpose of the foregoing example (e.g., CUST TBL and STORE TBL each having 1000 rows) a perfect distribution is assumed. It is reiterated that a variety of distribution schemes may be employed, resulting in different distributions of the foregoing tables. Thus, the database may be distributed in the assumed manner amongst mass storage device 164 and 176 as follows. For example, mass storage device 164 includes CUST TBL' 166, which includes exactly one half of the distributed database's thousand rows of CUST TBL (e.g., five hundred rows), and storage device 176 includes CUST TBL' 178, which includes the other half of the distributed database's thousand rows of CUST TBL (e.g., five hundred rows). Therefore, CUST TBL is represented by CUST TBL' 166 and CUST CUST TBL1' 178. Similarly, for example, mass storage device 164 includes STORE TBL' 168, which includes half of the distributed database's thousand rows of STORE TBL (e.g., five hundred rows), and storage device 176 includes STORE TBL' 180, which includes the other half of the distributed database's thousand rows of STORE TBL' (e.g., five hundred rows). Therefore, STORE TBL is represented by STORE TBL' 168 and STORE TBL' 180. It is reiterated that the illustrated distributions of CUST TBL and STORE TBL are examples of the initial distributions that are accessible by respective AMPs 130, 146. Additional mass storage devices (e.g., similar to storage device 164, 176) and respective AMPs (e.g., similar to AMPs 130, 146) may be provided, facilitating different distributions of the database across the mass storage devices and access thereto via the respective AMPs.

Now with reference to the operation of DMBS 106 of FIG. 1, the following example SLQ spatial query will illustrate the inventive spatial partitioning and spatial joining in accordance with the foregoing example distribution of the database (e.g., spatial distribution of CUST TBL and STORE TBL) amongst storage devices 164, 176 of FIG. 1. For example, to resolve the following spatial query, "SELECT c.name s.address FROM CUST TBL c, STORE TBL s WHERE.c.location.buffer(10) INTERSECTS s.location," which is to retrieve those customer names that are within 10 miles of store addresses, it will be necessary for the DBMS 106 to spatially redistribute parts of the table CUST TBL, or STORE TBL, or both based on location before each of the AMPs 130, 146 may perform a join operation "c.location.buffer(10) INTERSECTS s.location" that resolves the spatial query. More specifically, as part of determining the optimized plan, the optimizer module 116 of the parsing engine 108 may generate multiple statement trees (converted into AMP steps by the step generator module 124) to redistribute the input data (e.g., 166, 178, 168, 180) to respective intermediate files 170, 172, 182, 184 in order to resolve the spatial query. For example, the optimizer 116 may first choose (via an AMP step) to spatially redistribute CUST TBL as follows. The optimizer instructs each AMP 130,146 to map local spatial objects in its CUST TBL (e.g., 166, 178) to the N×N grid and to redistribute rows representing the mapped spatial objects to an appropriate AMP 130,146 based on a hash of a grid cell number of the N×N grid. The optimizer 116 also instructs each AMP 130, 146 to subdivide each of one or more skewed N spatial cells into an M×M grid with each M cell having a subset of spatial objects in the N cell in order to eliminate skew (too many spatial objects), map the spatial objects in CUST TBL to the M×M grid and to redistribute rows representing the mapped spatial objects to an appropriate AMP 130,146 based on a hash of a grid cell number of the M×M grid. It is noted that the N and M cells may be numbered using a space filling curve. Each M×M grid definition is returned to the parsing engine 108 via the dispatcher module 126. The redistributed rows are received and processed by the row receiving module 140, 156, which stores the rows to the intermediate CUST FILE 170, 182.

Further with reference to the operation of DMBS 106 of FIG. 1, the optimizer 116 may next choose (via an AMP step) to spatially redistribute the STORE TBL as follows. The optimizer instructs each AMPs 130,146 to map local spatial objects in its STORE TBL to the N×N grid (including any subsidized N cells) and to redistribute rows representing the mapped spatial objects to an appropriate AMP 130,146 based on a hash of a grid cell number of the N×N grid or a hash of a grid cell number of the M×M grid cell of the subdivided N cell. The redistributed rows are received and processed by the row receiving module 140, 156, which stores the rows to the intermediate STORE FILE 172, 184. After spatial redistribution of the example tables CUST TBL and STORE TBL, the optimizer 116 may thereafter choose (via an AMP step) to perform a spatial join on the spatially redistributed tables, CUST TBL and STORE TBL, via join of the intermediate CUST FILE 170 to intermediate STORE FILE 172 and intermediate CUST FILE 182 intermediate STORE FILE 184. The table joining module 142, 158 performs the spatial join between intermediate files and stores the result of the join to the result file 174, 186. The table joining module 142, 158 may use the in memory plane sweep to perform the join operation. More specifically, the table joining module 142, 158 determines for each cell of the N×N grid or the M×M grid whether all spatial objects (e.g., rows) of a cell from intermediate CUST FILE (e.g., 170, 182) and intermediate STORE FILE (e.g., 172, 184) fit into memory (not shown in FIG. 1). If so, all spatial objects from both intermediate files are read into memory and in memory plane sweep is directly executed to join the read spatial objects.

Still further with reference to the joining operation of DMBS 106 of FIG. 1, if however spatial objects of only the intermediate CUST FILE (e.g., 170, 182) or the intermediate STORE FILE (e.g., 172, 184) of a cell (e.g., N or M cell) fit into memory, all spatial objects of that intermediate file for the cell are read into memory and all spatial objects of the other intermediate file for the cell are read into memory in predetermined size chunks (one or more spatial objects at a time). The in plane memory sweep is therefore successively or iteratively executed on all spatial objects for the cell from the first intermediate file and spatial objects of predetermined chunks read from the second intermediate file until all spatial objects have been read. If none of the spatial objects of a cell from the intermediate CUST FILE (e.g., 170, 182) or the intermediate STORE FILE (e.g., 172, 184) fit into memory, the cell is recursively subdivided into M'×M' cells until spatial objects belonging to that cell from at least one (or both) of the intermediate files fit into memory. The spatial objects belonging to each M' cell are joined using in plane memory sweep. If all objects of an M' cell from both of the intermediate files ft into memory, in plane memory sweep is therefore performed on all spatial objects of that M' cell. However, if all objects of an M' cell from only one of the intermediate files fits into memory, all spatial objects of the other intermediate file for the M' cell are read into memory in predetermined size chunks (one or more spatial objects at a time). The in plane memory sweep is therefore successively or iteratively executed on all spatial objects for the M' cell from the first intermediate file and spatial objects of predetermined chunks read from the second intermediate file until all spatial objects have been read. In a degenerate case in which cell subdivision will not lead to spatial objects belonging to an N or M cell from at least one (or both) of the intermediate files to fit into memory, the following approach is used. Spatial objects of one of the intermediate file for the cell are read into memory in successive first predetermined chunks (one or more spatial objects at a time) and spatial objects of the other intermediate file for the cell are read into memory in successive second predetermined size chunks (one or more spatial objects at a time). The in plane memory sweep is therefore successively or iteratively executed on all spatial objects in the first predetermined chunks and the second predetermined chunks until all spatial objects are read. Upon execution of all AMP steps, including spatial join, the step processing module 131, 147 of each respective AMP 130, 146 transmits via interconnect network 128 its respective result file 174, 186 to the dispatcher module 126, which combines or joins the result files 174, 186 and returns the combined result file to the requesting system 102 in response to the spatial query.

Figure 2A:
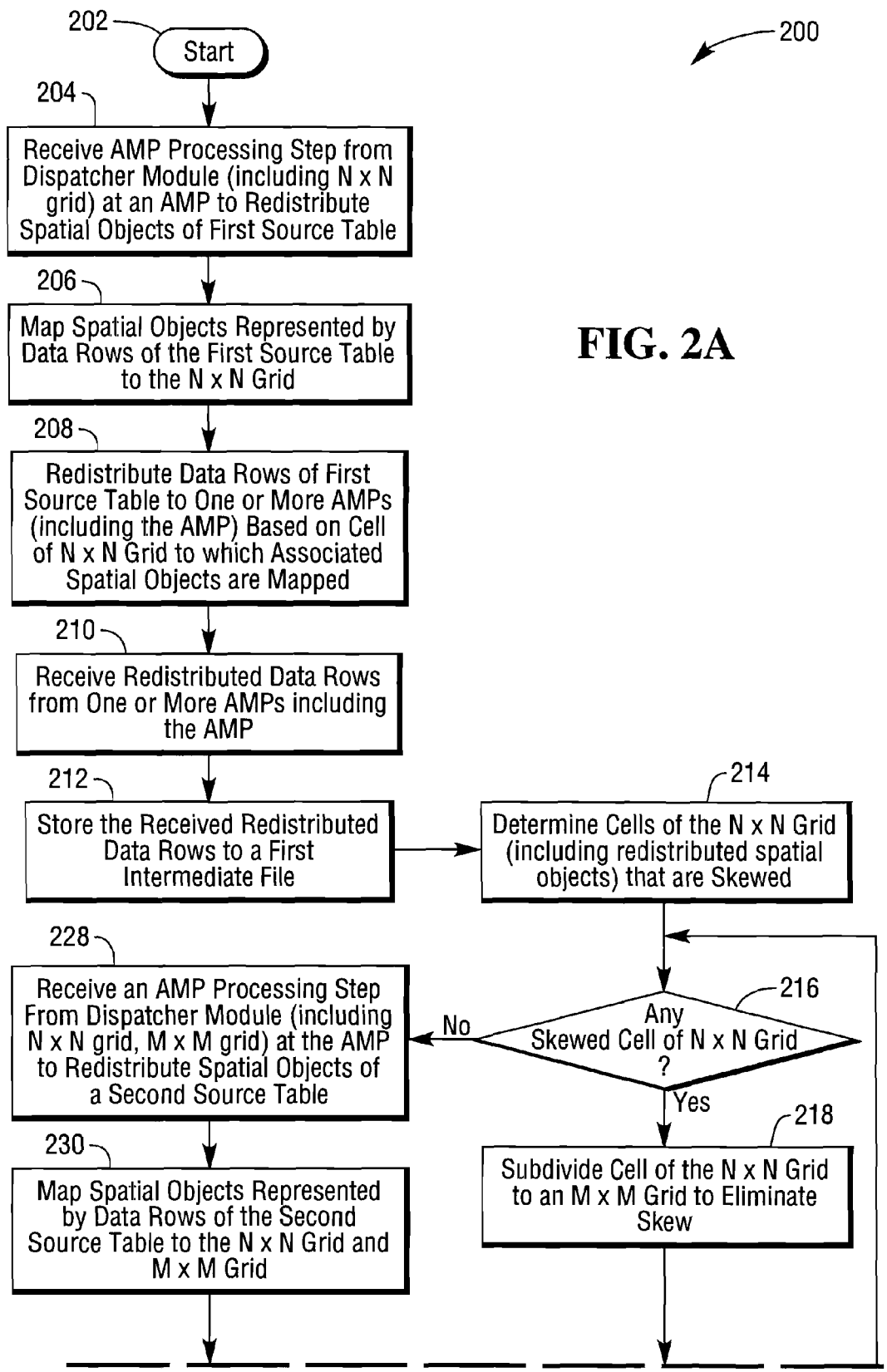
FIG. 2 is a flowchart that illustrates an example method performed by step processing modules of access module processors to spatially redistribute input data amongst respective storage devices of the distributed mass storage in accordance with FIG. 1.
Figure 2B:
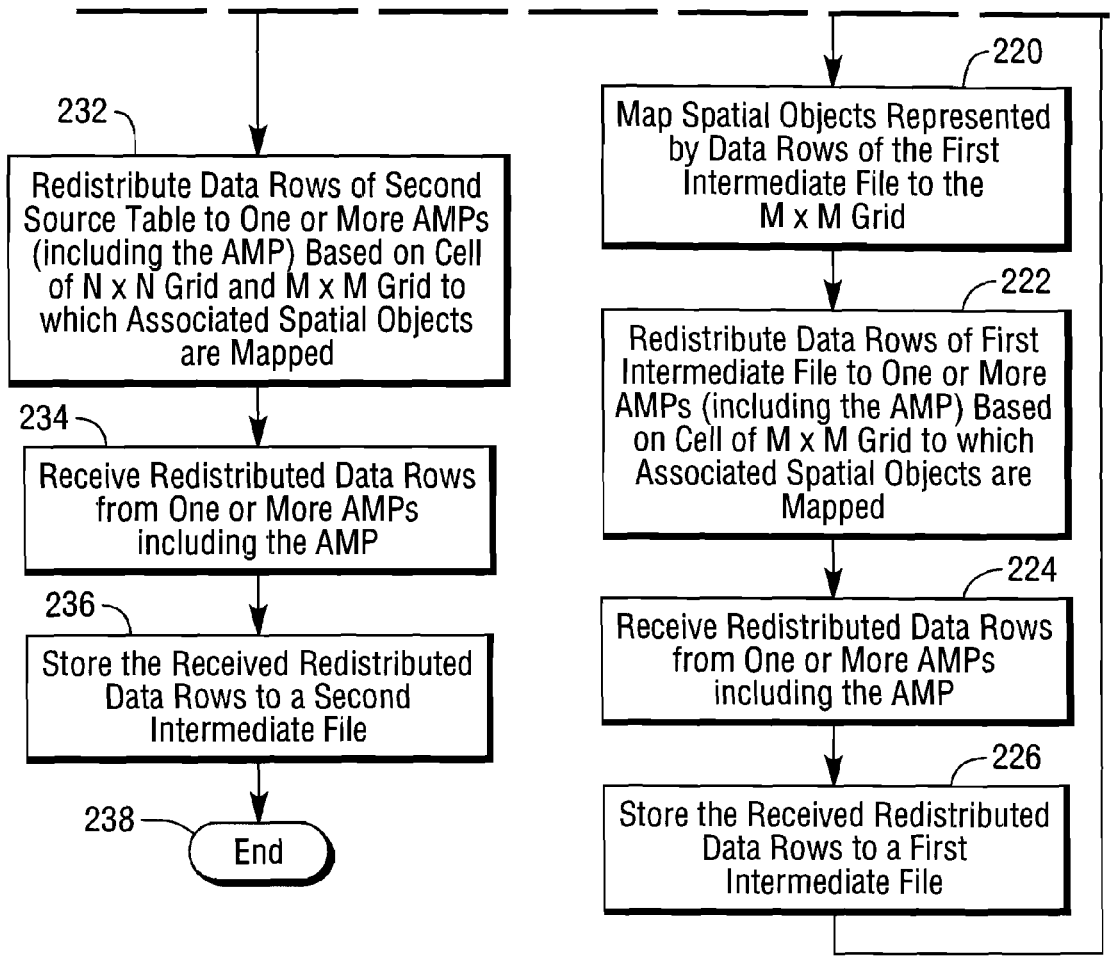

FIG. 2 is a flowchart that illustrates an example method 200 performed by step processing modules 131, 147 of AMPs 130, 146 to spatially redistribute input data (e.g., CUST TBL 166, 178 and STORE TBL 168, 180) amongst respective storage devices 164, 176 of the distributed mass storage 162. The method 200 starts at operation 202. At operation 204, the step processing module 131, 147 of each AMP 130, 146 receives an AMP processing step from the dispatcher module 126 of the parsing engine 108 (including the N×N grid) via interconnect network 128 to redistribute spatial objects of a first source table (e.g., data rows of CUST TBL 166, 178 or STORE TBL 168, 180) to appropriate AMPs 130, 146. At operation 206, the object mapping module 132, 148 maps spatial objects represented by data rows of the first source table to the N×N grid. At operation 208, the row redistribution module 134, 150 redistributes data rows of the first source table to one or more AMPs 130, 146 (the particular AMP that redistributes a data row may also receive that data rows upon redistribution) based on a cell of the N×N grid to which the associated spatial objects are mapped. The redistributed data rows are received from one or more AMPs 130, 146 at each AMP 130, 146 at operation 210. At operation 212, the file system module 144, 160 of each AMP 130, 146 stores the received redistributed data rows to a first intermediate file (e.g., intermediate CUST TBL 170, 182 or intermediate STORE TBL 172, 184).

Further with reference to FIG. 2, at operation 214 the skew determination module 138, 152 of respective AMP 130, 146 determines the cells of the N×N grid (including redistributed spatial objects) that are skewed, e.g., cells that include more spatial objects than an average number of spatial objects across the cells of the N×N grid. If it is determined that a cell of the N×N is skewed at operation 216, then at operation 218 the spatial cell subdivision and grid update module 138, 154 subdivides the cell of the N×N grid to an M×M grid to eliminate the skew, e.g., where each M cell has fewer spatial objects comparable to the average number of spatial cells across the N×N grid. The spatial cell subdivision and grid update module 138, 154 further transmits an update of the N×N grid (e.g., subdivided by m×M grid) to the dispatcher module 126. At operation 220, the object mapping module 132, 154 maps spatial objects represented by data rows of the first intermediate file to the M×M grid. Furthermore, the row redistribution 134, 150 redistributes data rows of the first intermediate file to one or more AMPs 130, 146 (the particular AMP that is redistributes a data row may also receive that data row upon redistribution) based on a cell of the M×M grid to which the associated spatial objects are mapped. The row receiving module 140, 156 receives the redistributed data rows from one or more AMPs 130, 146. At operation 226, the file system module 144, 160 stores the received redistributed data rows to the first intermediate file. Thereafter, the method 200 continues at operation 216 to process any remaining skewed cells via operations 216 through 226.

Yet further with reference to FIG. 2, if at operation 216 it is determined that there are no skewed cells remaining (e.g., skewed cells have been subdivided or none existed), the method continues at operation 228 where the step processing module receives where the step processing module 131, 147 of each AMP 130, 146 receives an AMP processing step from the dispatcher module 126 of the parsing engine 108 (including the N×N grid, M×M grid) via interconnect network 128 to redistribute spatial objects of a second source table (e.g., data rows of the other of CUST TBL 166, 178 or STORE TBL 168, 180) to appropriate AMPs 130, 146. At operation 230, the object mapping module 132, 148 maps spatial objects represented by data rows of the second source table to the N×N grid and the M×M grid. At operation 232, the row redistribution module 134, 150 redistributes data rows of the second source table to one or more AMPs 130, 146 (the particular AMP that redistributes a data row may also receive that data rows upon redistribution) based on a cell of the N×N grid and M×M grid to which the associated spatial objects are mapped. The redistributed data rows are received from one or more AMPs 130, 146 at each AMP 130, 146 at operation 234. At operation 236, the file system module 144, 160 of each AMP 130, 146 stores the received redistributed data rows to a second intermediate file (e.g., the other of the intermediate CUST TBL 170, 182 or intermediate STORE TBL 172, 184). The method 200 ends at operation 238.

Figure 3A:
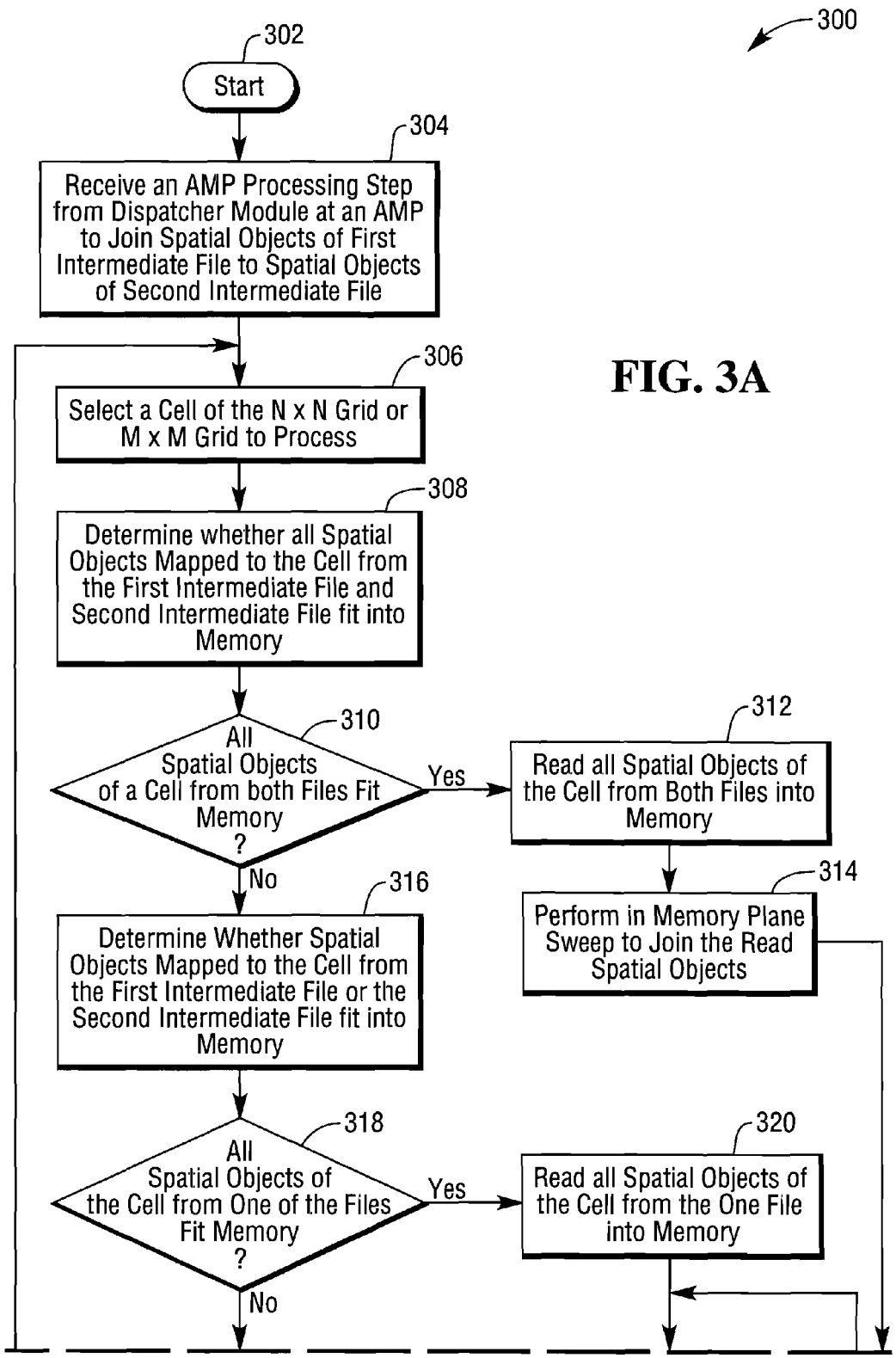
FIG. 3 is a flowchart that illustrates an example method performed by each step processing module of access module processors to spatially join spatial objects stored in storage devices of the distributed mass storage 162.
Figure 3B:
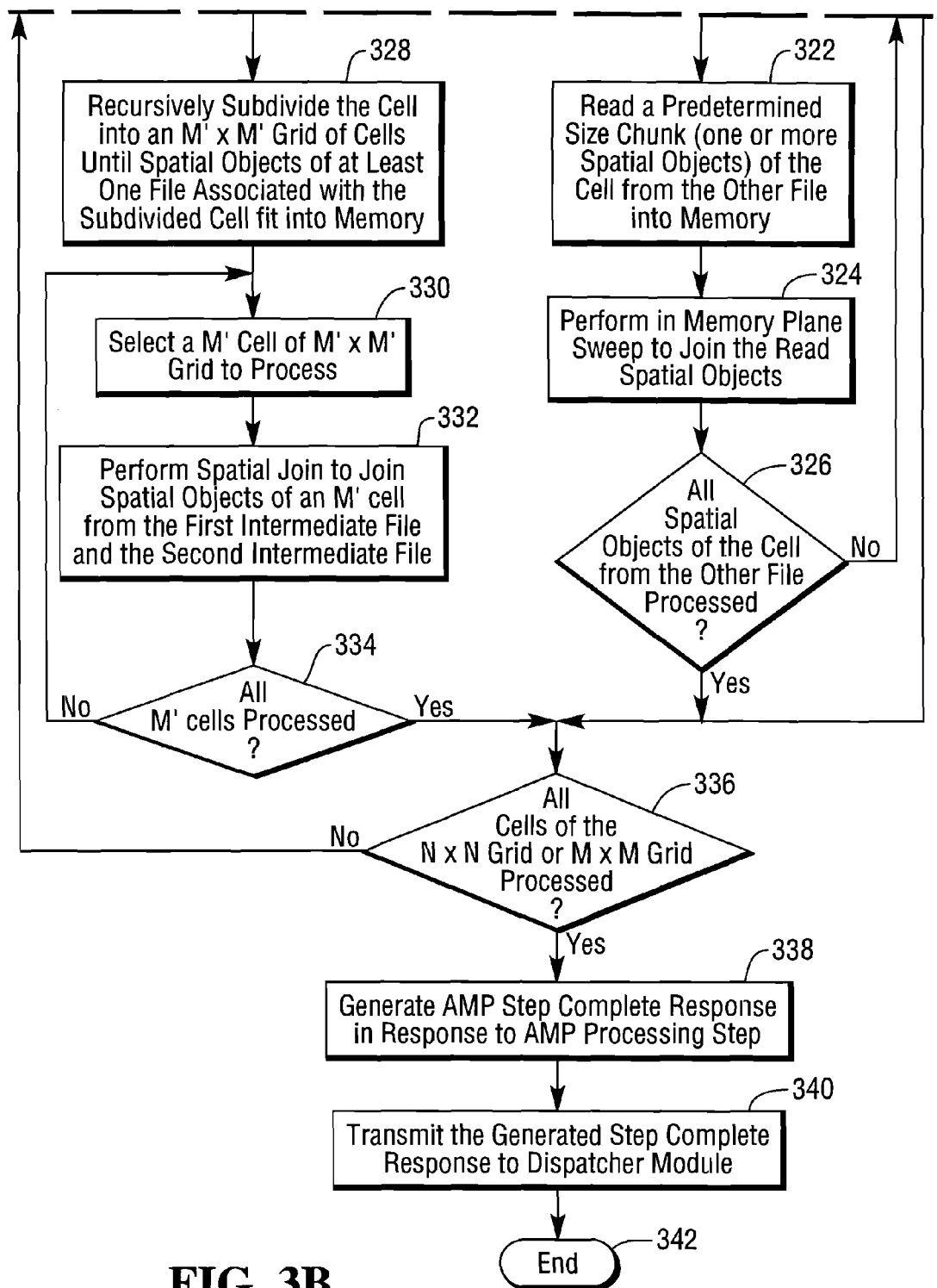

FIG. 3 is a flowchart that illustrates an example method 300 performed by each step processing modules 131, 147 of AMPs 130, 146 to spatially join spatial objects (e.g., intermediate CUST FILE 170, 182 and intermediate STORE FILE 172, 184) stored in storage devices 164, 176 of the distributed mass storage 162. The method 200 starts at operation 302. At this point, spatial objects have been mapped to appropriate N×N grid and M×M grid(s), and redistributed to appropriate AMPs 130,146. At operation 304, the step processing module 131, 147 of the AMP 130, 146 receives an AMP processing step from the dispatcher module 126 of the parsing engine 108 via interconnect network 128 to join spatial objects of a first intermediate file to spatial objects of a second intermediate file. Operations 306-336 are performed by the table joining module 142, 158. At operation 306, a cell of the N & N grid or cell of M×M grid is selected for processing. At operation 308 it is determined whether all spatial objects mapped to the selected cell from the first intermediate file and the second intermediate file fit into memory. At operation 310, if it is determined that all spatial objects of the selected cell from both intermediate files fir memory, the method 300 continues at operation 312 in which the spatial objects of the selected cell are read from both files into memory. At operation 314, the table joining module 142, 158 performs in memory plane sweep to join the read spatial objects of the intermediate files. It is noted that the file system module 144, 160 stores the output of the join to the result file 174, 186. The method continues at operation 336 in which it is determined whether all the cells of the N×N or M×M grid(s) have been processed. If all the N×N and M×M cells have been processed, at operation 338 each of the step processing module 141, 147 of AMPs 130, 146 generates an AMP step completion response that includes the result file in response to the AMP processing step received at operation 304. Thereafter, the generated step completion response is transmitted to the dispatcher module 126 at operation 340 and the method ends at operation 342. If however, all cells of the N×N grid or the M×M grid(s) have not been processed at operation 336, the method continues at operation 306 to select another cell to process.

Further with reference to operation 310 of FIG. 3, if all spatial objects of the selected cell from both intermediate files do not fit into memory, at operation 316 it is determined whether spatial objects mapped to the selected cell from the first intermediate file or the second intermediate file fit into memory. If it is determined all spatial objects of the selected cell from one of the intermediate files fit into memory, the method 300 continues at operation 320 where all spatial objects of the selected cell from the one file are read into memory. At operation 322, a predetermined size chunk (including one or more spatial objects) of the selected cell from the other file is read into memory. At operation 324, the table joining module 142, 158 performs in memory plane sweep to join the read spatial objects of the intermediate files. At operation 326 it is determined whether all spatial objects of the selected cell from the other file have been processed. If all spatial object of the other file have not been proceed, the method 300 continues at operation 322 and is followed by operation 324 until all spatial object of the other file have been processed. Thereafter, the method continues at operation 336 where is it determined whether all cells of the N×N grid of the M×M grid(s) have been processed.

Further with reference to operation 318 of FIG. 3, if the spatial objects for the selected cell of neither intermediate file fit into memory, the method 300 continues at operation 328 where the selected cell is recursively subdivided into an M'×M' grid of cells until spatial objects of at least one intermediate file associated the subdivided selected cell and for an M' cell fit into memory. The foregoing recursive subdivision is similar to skewed cell subdivision described hereinabove with reference to FIG. 2. At operation 330, an M' cell of the M'×M' grid is selected for processing. At operation 332, spatial objects from the first intermediate file and the second intermediate file that are associated with the M' cell are spatially joined. The spatial joining of an M' cell will be described in particular detail with reference to FIG. 4 below. At operation 334, it is determined whether all M' cells of the M'×M' grid have been processed. If other M' cells remain to be processed, the method continues at operation 330 to process the other M' cells. Alternatively, if no other M' cells remain to be processed, the method 300 continues at operation 336 where it is determined whether all cells of the N×N grid or the M×M grid(s) have been processed. If all the N×N and M×M cells have been processed, at operation 338 each of the step processing module 141, 147 of AMPs 130, 146 generates an AMP step completion response that includes the result file in response to the AMP processing step received at operation 304. Thereafter, the generated step completion response is transmitted to the dispatcher module 126 at operation 340 and the method ends at operation 342.

Figure 4B:
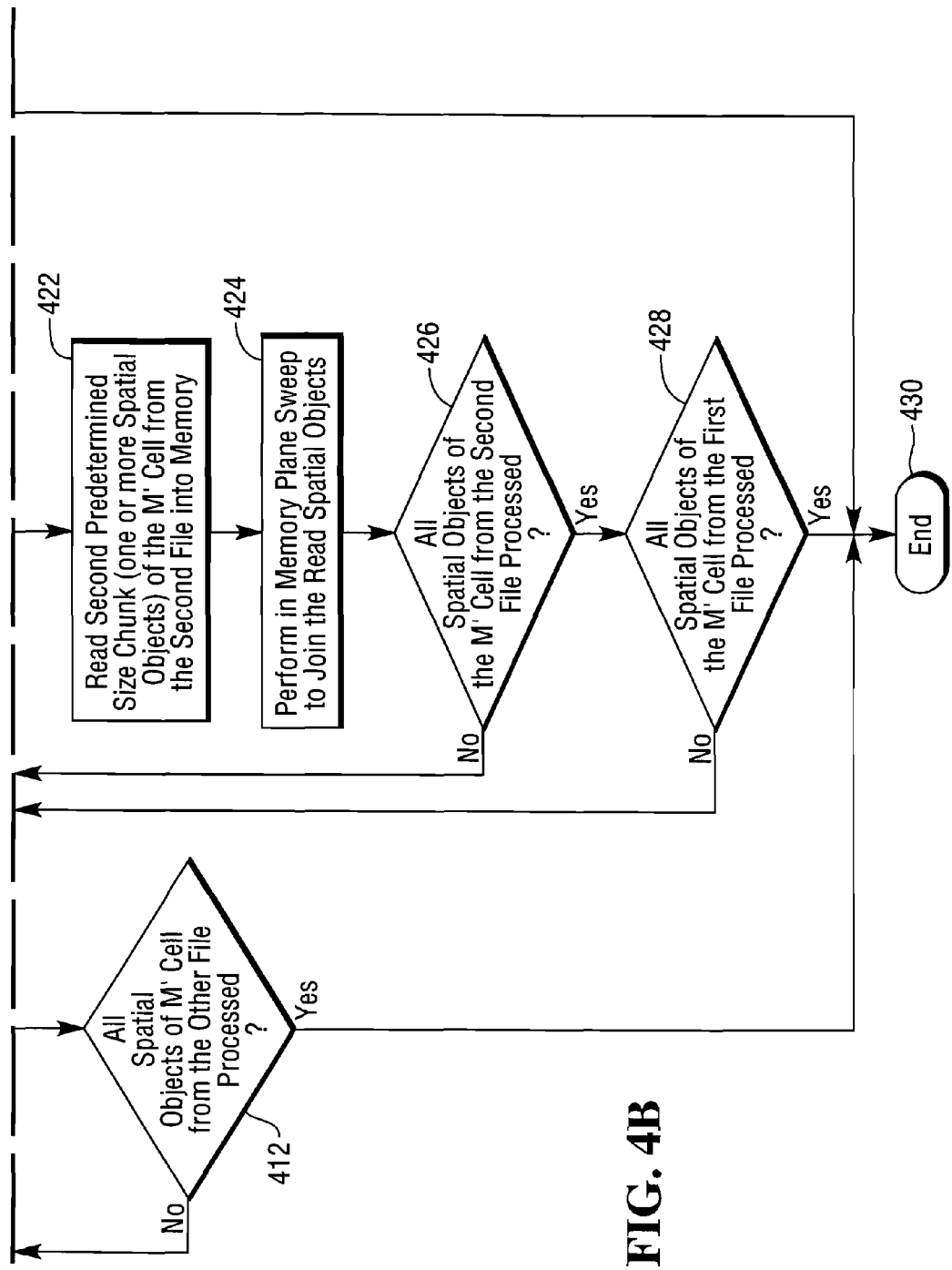
FIG. 4 is a flowchart that illustrates an example method performed by each step processing modules of access module processors to spatially join spatial objects of a M' cell of an M'×M' grid in accordance with FIG. 3.

FIG. 4 is a flowchart that illustrates an example method 400 performed by each step processing modules 131, 147 of AMPs 130, 146 to spatially join spatial objects (e.g., intermediate CUST FILE 170, 182 and intermediate STORE FILE 172, 184) of an M' cell of the M'×M' grid. The method 400 begins at operation 402. It is noted at this point that the M' cell to be processed was selected at operation 330 of FIG. 3 described hereinabove. It is further noted that operations 404-428 are performed by the table joining modules 142, 158 of respective step processing modules 131, 147 of the AMPs 13, 146. Therefore, if at operation 404 it is determined that all spatial objects of the selected M' cell from only one of the intermediate files fit into memory, the method continues at operation 406 where all spatial objects of the M' cell from the one intermediate file are read into memory. At operation 408, a predetermined size chunk (one or more spatial objects) of the selected M' cell from the other file is read into memory. An in memory plane sweep is performed to join the read spatial objects at operation 410. At operation 412, it is determined whether all spatial objects of the selected M' cell from the other file have been processed. If all spatial cells of the M' cell have been processed the method 400 continues at operation 430 where method 400 ends. Alternatively, the method 400 continues at operation 408 and operations 408-412 are repeated until all spatial objects of the selected M' cell from the other file have been processed.

Further with reference to operation 404 of FIG. 4, if it is determined that all spatial objects of the selected M' cell from both intermediate files fit into memory, the method continues at operation 416 where all spatial objects of the M' selected cell from the both intermediate files are read into memory. An in memory plane sweep is performed to join the read spatial objects at operation 418 and the method 400 ends at operation 430. However, if the spatial objects of the selected M' cell from both intermediate files do not fit into memory, the method 400 continues with operations 420-428. Therefore, at operation 420 a first predetermined size chunk (one or more spatial objects) of the selected M' cell is read from the first intermediate file into memory. At operation 422, a second predetermined size chunk (one or more spatial objects) of the selected M' cell is read from the second intermediate file into memory. At operation 424 an in memory plane sweep is performed to join the read spatial objects. At operation 426 it is determined whether all spatial objects of the selected M' cell from the second intermediate file have been processed. If all spatial objects from the second intermediate file have not been processed, operations 422-426 are repeated until all spatial objects have been processed and the method 400 continues at operation 428 where it is determined whether all spatial objects of the selected M' cell from the first intermediate file have been processed. If all spatial objects from the first intermediate file have not been processed, operations 420-428 are repeated until all spatial objects have been processed. Thereafter, the method 400 ends at operation 430.

FIG. 5 is a diagrammatic representation of machine in an example form of a computer system within which a set of instructions, for causing the machine to perform any one or more of the methodologies discussed herein in FIGS. 1-4, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 5, the example computer system 500 includes one or more processor 502 (e.g., central processing units (CPUs), a graphics processing unit (GPU) or both), a main memory 504 and a static memory 506, which communicate with each other via a bus 520. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), one or more disk drive units 516, a signal generation device 518 (e.g., a speaker), a network interface device 508, and host interface device 528.

Still further with reference to FIG. 5, one or more of the disk drive units 516 includes machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the one or more processors 502 during execution thereof by the computer system 500, the main memory 504 and the one or more processors 502 also constituting machine-readable media. The software 524 may further be transmitted or received over a network 526 via the network interface device 508 utilizing any one of a number of well-known transfer protocols (e.g., HTTP).

Lastly with reference to FIG. 5, while the machine-readable medium 522 is shown in the example embodiment to be a single medium, the term "machine-readable medium-"should be taken to include a single tangible medium or multiple tangible media (e.g., a centralized or distributed database, and/or associated caches and servers) that store the one or more sets of instructions. The term "machine-readable medium"shall also be taken to include any tangible medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium-"shall accordingly be taken to include, but not be limited to, solid-state memories, and optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, an example system, method and machine readable medium for optimizing storage allocation in a database management system have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A computer-implemented method to execute a spatial query against a plurality of input tables of a distributed database, the method comprising:

mapping, by a computer system, spatial objects of a first input table to a first spatial grid, the first spatial grid including a plurality of first spatial cells;

redistributing, by said computer system, the spatial objects of the first input table to a first intermediate table of one or more access module processors within said computer system based on the first spatial cell of the first spatial grid to which each of the spatial objects is mapped;

determining, by said computer system, whether one or more first spatial cells of the first spatial grid are skewed;

subdividing, by said computer system, each of the skewed one or more first spatial cells to a second spatial grid, the second spatial grid including a plurality of second spatial cells;

mapping, by said computer system, spatial objects of the first intermediate file to the second spatial grid, the second spatial grid including a plurality of second spatial cells;

redistributing, by said computer system, the spatial objects of the first intermediate file to one or more access module processors within said computer system based on the second spatial cell of the second spatial grid to which each of the spatial objects is mapped;

mapping, by said computer system, spatial objects of a second input table to the first spatial grid and the second spatial grid;

redistributing, by said computer system, the spatial objects of the second input table to a second intermediate file of one or more access module processors within said computer system based on the first spatial cell of the first spatial grid and the second spatial cell of the second spatial grid to which each of the spatial objects is mapped; and joining, by said computer system, the spatial objects of the first intermediate file to spatial objects of the second intermediate file for each first spatial cell of the first spatial grid or second spatial cell of the second spatial grid.

2. The method of claim 1, wherein redistributing spatial objects of the first input table further comprises:

receiving redistributed spatial objects from one or more access module processors; and storing, on a storage device, the received redistributed spatial objects to the first intermediate file.

3. The method of claim 1, wherein redistributing spatial objects of the first intermediate table further comprises:

receiving redistributed spatial objects from one or more access module processors; and storing, on a storage device, the received redistributed spatial objects to the first intermediate table.

4. The method of claim 1, wherein redistributing spatial objects of the second input table further comprises:

receiving redistributed spatial objects from one or more access module processors; and storing, on a storage device, the received redistributed spatial objects to the second intermediate file.

5. The method of claim 1, wherein joining the spatial objects comprises:

selecting, by said computer system, a cell of the first spatial grid or the second spatial grid to process;

determining, by said computer system, whether all spatial objects of the first intermediate file and spatial all objects of the second intermediate file that are mapped to the selected cell fit into memory;

reading, by said computer system, all spatial objects from the first intermediate file and the second intermediate that are mapped to the selected cell if all spatial objects of the selected cell from the first intermediate file and the second intermediate fit into memory; and performing, by said computer system, in memory plane sweep to join the read spatial objects.

6. The method of claim 5, wherein joining the spatial objects further comprises:

determining, by said computer system, whether all spatial objects from one intermediate file of the first intermediate file or the second intermediate file that are mapped to the selected cell fit into memory;

reading, by said computer system, all spatial objects from the one intermediate file that are mapped to the selected cell if all spatial objects of the selected cell from the one intermediate file fit into memory;

reading, by said computer system, a predetermined size chunk of one or more spatial objects that are mapped to the selected cell from the other intermediate file of the first intermediate file or the second intermediate file;

performing, by said computer system, in memory plane sweep to join the read spatial objects;

selectively reading, by said computer system, a predetermined size chunk of one or more spatial objects mapped to the selected cell and performing in memory plane sweep until all spatial objects of the other intermediate file are proceed.

7. The method of claim 6, wherein joining the spatial objects comprises:

subdividing the selected cell into a third spatial grid including a plurality of third spatial cells until spatial objects of at least one of the first intermediate file or the second intermediate file fit into memory;

selecting, by said computer system, a third spatial cell of the third spatial grid; and joining, by said computer system, the spatial objects of the first intermediate file to spatial objects of the second intermediate file for each third spatial cell of the third spatial grid.

8. The method of claim 7, wherein joining for each third spatial cell comprises:

determining, by said computer system, whether all spatial objects from one intermediate file of the first intermediate file or the second intermediate file that are mapped to the selected third spatial cell fit into memory;

reading, by said computer system, all spatial objects from the one intermediate file that are mapped to the selected third spatial cell if all spatial objects of the selected third spatial cell from the one intermediate file fit into memory;

reading, by said computer system, a predetermined size chunk of one or more spatial objects that are mapped to the selected third spatial cell from the other intermediate file of the first intermediate file or the second intermediate file; and performing, by said computer system, in memory plane sweep to join the read spatial objects.

9. The method of claim 7, wherein joining for each third spatial cell comprises:

determining, by said computer system, whether all spatial objects from the first intermediate file and the second intermediate file that are mapped to the selected third spatial cell fit into memory;

reading, by said computer system, all spatial objects from the first intermediate file and the second intermediate file that are mapped to the selected third spatial cell if all spatial objects of the selected third spatial cell from the first intermediate file and the second intermediate fit into memory; and performing, by said computer system, in memory plane sweep to join the read spatial objects.

10. The method of claim 9, wherein joining for each third spatial cell comprises:

reading, by said computer system, a first predetermined size chunk of one or more spatial objects that are mapped to the selected third spatial cell from one intermediate file of the first intermediate file or the second intermediate file if all spatial objects of the selected third spatial cell from the first intermediate file and the second intermediate do not fit into memory;

reading, by said computer system, a second predetermined size chunk of one or more spatial objects that are mapped to the selected third spatial cell from another intermediate file of the first intermediate file or the second intermediate file if all spatial objects of the selected third spatial cell from the first intermediate file and the second intermediate do not fit into memory; and performing, by said computer system, in memory plane sweep to join the read spatial objects.

11. The system of claim 1, further comprising:

a row receiving module to receive redistributed spatial objects from second input table of one or more access module processors; and a file system module to store the received redistributed spatial objects to the second intermediate file.

12. The system of claim 1, wherein the table joining module is to:

select a cell of the first spatial grid or the second spatial grid to process;

determine whether all spatial objects of the first intermediate file and spatial all objects of the second intermediate file that are mapped to the selected cell fit into memory;

read all spatial objects from the first intermediate file and the second intermediate that are mapped to the selected cell if all spatial objects of the selected cell from the first intermediate file and the second intermediate fit into memory; and perform in memory plane sweep to join the read spatial objects.

13. The system of claim 12, wherein the table joining module is further to:

determine whether all spatial objects from one intermediate file of the first intermediate file or the second intermediate file that are mapped to the selected cell fit into memory;

read all spatial objects from the one intermediate file that are mapped to the selected cell if all spatial objects of the selected cell from the one intermediate file fit into memory;

read a predetermined size chunk of one or more spatial objects that are mapped to the selected cell from the other intermediate file of the first intermediate file or the second intermediate file;

perform in memory plane sweep to join the read spatial objects; and selectively read a predetermined size chunk of one or more spatial objects mapped to the selected cell and perform in memory plane sweep until all spatial objects of the other intermediate file are proceed.

14. The system of claim 13, wherein the table joining module is further to:

subdivide the selected cell into a third spatial grid including a plurality of third spatial cells until spatial objects of at least one of the first intermediate file or the second intermediate file fit into memory;

select a third spatial cell of the third spatial grid; and join the spatial objects of the first intermediate file to spatial objects of the second intermediate file for each third spatial cell of the third spatial grid.

15. The system of claim 14, wherein the table joining module is further to:

determine whether all spatial objects from one intermediate file of the first intermediate file or the second intermediate file that are mapped to the selected third spatial cell fit into memory;

read all spatial objects from the one intermediate file that are mapped to the selected third spatial cell if all spatial objects of the selected third spatial cell from the one intermediate file fit into memory;

read a predetermined size chunk of one or more spatial objects that are mapped to the selected third spatial cell from the other intermediate file of the first intermediate file or the second intermediate file; and perform in memory plane sweep to join the read spatial objects.

16. The system of claim 14, wherein the table joining module is further to:

determine whether all spatial objects from the first intermediate file and the second intermediate file that are mapped to the selected third spatial cell fit into memory;

read all spatial objects from the first intermediate file and the second intermediate file that are mapped to the selected third spatial cell if all spatial objects of the selected third spatial cell from the first intermediate file and the second intermediate fit into memory; and perform in memory plane sweep to join the read spatial objects.

17. The system of claim 16, wherein the table joining module is further to:

read a first predetermined size chunk of one or more spatial objects that are mapped to the selected third spatial cell from one intermediate file of the first intermediate file or the second intermediate file if all spatial objects of the selected third spatial cell from the first intermediate file and the second intermediate do not fit into memory;

read a second predetermined size chunk of one or more spatial objects that are mapped to the selected third spatial cell from another intermediate file of the first intermediate file or the second intermediate file if all spatial objects of the selected third spatial cell from the first intermediate file and the second intermediate do not fit into memory; and performing in memory plane sweep to join the read spatial objects.

18. A computerized database system to execute a spatial query against a plurality of input tables of a distributed database, the computerized database system comprising:

at least one storage device; and at least one processor for executing software modules including:

a spatial object mapping module to map spatial objects of a first input table to a first spatial grid that includes a plurality of first spatial cells, to map spatial objects of a first intermediate file to a second spatial grid that includes a plurality of second spatial cells, and to map spatial objects of a second input table to the first spatial grid and the second spatial grid;

a skew determination module to determine whether one or more first spatial cells of the first spatial grid are skewed;

a spatial cell subdivision module to subdivide each of the skewed one or more first spatial cells to the second spatial grid that includes a plurality of second spatial cells;

a redistribution module to redistribute the spatial objects of the first intermediate file to one or more access module processors based on the second spatial cell of the second spatial grid to which each of the spatial objects is mapped, and to redistribute the spatial objects of the second input table to a second intermediate file of one or more access module processors based on the first spatial cell of the first spatial grid and the second spatial cell of the second spatial grid to which each of the spatial objects is mapped; and a table joining module to join spatial objects of the first intermediate file to spatial objects of the second intermediate file for each first spatial cell of the first spatial grid or second spatial cell of the second spatial grid.

19. The system of claim 18, further comprising:

a row receiving module to receive redistributed spatial objects from first input table of one or more access module processors; and a file system module to store the received redistributed spatial objects to the first intermediate file.

20. The system of claim 18, further comprising:

a row receiving module to receive redistributed spatial objects from first intermediate file of one or more access module processors; and a file system module to store the received redistributed spatial objects to the first intermediate file.

21. A machine-readable storage medium including instructions executable by the machine to execute a spatial query against a plurality of input tables of a distributed database, the instructions causing the machine to:

map spatial objects of a first input table to a first spatial grid, the first spatial grid including a plurality of first spatial cells; redistribute the spatial objects of the first input table to a first intermediate table of one or more access module processors based on the first spatial cell of the first spatial grid to which each of the spatial objects is mapped;

determine whether one or more first spatial cells of the first spatial grid are skewed;

subdivide each of the skewed one or more first spatial cells to a second spatial grid, the second spatial grid including a plurality of second spatial cells;

map spatial objects of the first intermediate file to the second spatial grid, the second spatial grid including a plurality of second spatial cells;

redistribute the spatial objects of the first intermediate file to one or more access module processors based on the second spatial cell of the second spatial grid to which each of the spatial objects is mapped;

map spatial objects of a second input table to the first spatial grid and the second spatial grid;

redistribute the spatial objects of the second input table to a second intermediate file of one or more access module processors based on the first spatial cell of the first spatial grid and the second spatial cell of the second spatial grid to which each of the spatial objects is mapped; and join the spatial objects of the first intermediate file to spatial objects of the second intermediate file for each first spatial cell of the first spatial grid or second spatial cell of the second spatial grid.

22. The machine-readable storage medium of claim 21, wherein the instruction to redistribute spatial objects of the first input table further includes instructions causing the machine to:

receive redistributed spatial objects from one or more access module processors; and store the received redistributed spatial objects to the first intermediate file.

23. The machine-readable storage medium of claim 21, wherein the instruction to redistribute spatial objects of the first intermediate table further includes instructions causing the machine to:

receive redistributed spatial objects from one or more access module processors; and store the received redistributed spatial objects to the first intermediate table.

24. The machine-readable storage medium of claim 21, wherein instruction to redistribute spatial objects of the second input table further includes instructions causing the machine to:

receive redistributed spatial objects from one or more access module processors; and store the received redistributed spatial objects to the second intermediate file.

25. The machine-readable storage medium of claim 21, wherein the instruction to join the spatial objects further includes instructions causing the machine to:

select a cell of the first spatial grid or the second spatial grid to process;

determine whether all spatial objects of the first intermediate file and spatial all objects of the second intermediate file that are mapped to the selected cell fit into memory;

read all spatial objects from the first intermediate file and the second intermediate that are mapped to the selected cell if all spatial objects of the selected cell from the first intermediate file and the second intermediate fit into memory; and perform in memory plane sweep to join the read spatial objects.

26. The machine-readable storage medium of claim 25, wherein the instruction to join the spatial objects further includes instructions causing the machine to:

determine whether all spatial objects from one intermediate file of the first intermediate file or the second intermediate file that are mapped to the selected cell fit into memory;

read all spatial objects from the one intermediate file that are mapped to the selected cell if all spatial objects of the selected cell from the one intermediate file fit into memory;

read a predetermined size chunk of one or more spatial objects that are mapped to the selected cell from the other intermediate file of the first intermediate file or the second intermediate file;

perform in memory plane sweep to join the read spatial objects;

selectively read a predetermined size chunk of one or more spatial objects mapped to the selected cell and perform in memory plane sweep until all spatial objects of the other intermediate file are proceed.

27. The machine-readable storage medium of claim 26, wherein the instruction to join the spatial objects further includes instructions causing the machine to:
- subdivide the selected cell into a third spatial grid including a plurality of third spatial cells until spatial objects of at least one of the first intermediate file or the second intermediate file fit into memory;
- select a third spatial cell of the third spatial grid; and
- join the spatial objects of the first intermediate file to spatial objects of the second intermediate file for each third spatial cell of the third spatial grid.

28. The machine-readable storage medium of claim 27, wherein the instruction to join for each third spatial cell further includes instructions causing the machine to:
- determine whether all spatial objects from one intermediate file of the first intermediate file or the second intermediate file that are mapped to the selected third spatial cell fit into memory;
- read all spatial objects from the one intermediate file that are mapped to the selected third spatial cell if all spatial objects of the selected third spatial cell from the one intermediate file fit into memory;
- read a predetermined size chunk of one or more spatial objects that are mapped to the selected third spatial cell from the other intermediate file of the first intermediate file or the second intermediate file; and
- perform in memory plane sweep to join the read spatial objects.

29. The machine-readable storage medium of claim 27, wherein the instruction to join for each third spatial cell further includes instructions causing the machine to:
- determine whether all spatial objects from the first intermediate file and the second intermediate file that are mapped to the selected third spatial cell fit into memory;
- read all spatial objects from the first intermediate file and the second intermediate file that are mapped to the selected third spatial cell if all spatial objects of the selected third spatial cell from the first intermediate file and the second intermediate fit into memory; and
- perform in memory plane sweep to join the read spatial objects.

30. The machine-readable storage medium of claim 29, wherein the instruction to join for each third spatial cell further includes instructions causing the machine to:
- read a first predetermined size chunk of one or more spatial objects that are mapped to the selected third spatial cell from one intermediate file of the first intermediate file or the second intermediate file if all spatial objects of the selected third spatial cell from the first intermediate file and the second intermediate do not fit into memory;
- read a second predetermined size chunk of one or more spatial objects that are mapped to the selected third spatial cell from another intermediate file of the first intermediate file or the second intermediate file if all spatial objects of the selected third spatial cell from the first intermediate file and the second intermediate do not fit into memory; and
- perform in memory plane sweep to join the read spatial objects.

* * * * *